(12) United States Patent  
Asano

(10) Patent No.: US 7,188,796 B2  
(45) Date of Patent: Mar. 13, 2007

(54) MAGNETIC TAPE CARTRIDGE

(75) Inventor: Katsuki Asano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 222 days.

(21) Appl. No.: 10/828,167

(22) Filed: Apr. 21, 2004

(65) Prior Publication Data

US 2005/0023396 A1    Feb. 3, 2005

(30) Foreign Application Priority Data

Aug. 1, 2003    (JP)    ............................. 2003-285140

(51) Int. Cl.
G11B 23/107    (2006.01)
(52) U.S. Cl. ...................................... 242/348; 360/132
(58) Field of Classification Search ............. 242/338.1, 242/343, 348, 348.2; 360/132
See application file for complete search history.

(56) References Cited

U.S. PATENT DOCUMENTS 6,452,748 B1* 9/2002 Shima et al. ................ 360/132
6,563,671 B2* 5/2003 Morita et al. ................ 360/132

FOREIGN PATENT DOCUMENTS

JP    2002-197833 A    7/2002

* cited by examiner

*Primary Examiner*—John Q. Nguyen
(74) *Attorney, Agent, or Firm*—Sughrue Mion, PLLC

(57) ABSTRACT

A reel which rotates to wind or feed out the recording or recordable tape wound therearound is set in a cartridge. The reel rotation is locked by a reel lock that seizes the reel by being pushed against the reel with a spring and is unlocked by the release pad pushed back against the force of the spring. The release pad has a pivot, of which tip has a partial globe shape head, on the surface facing to the reel lock and the reel lock has a recess on the surface facing to the release pad. The curvature of the recess is larger than that of the pivot. The head of the pivot contacts within the recess. Then the pivot and the recess on reel lock surface can keep uniformly wear out in tape winding or feeding out and the reel lock hardly generates sound noise in the operation.

6 Claims, 8 Drawing Sheets

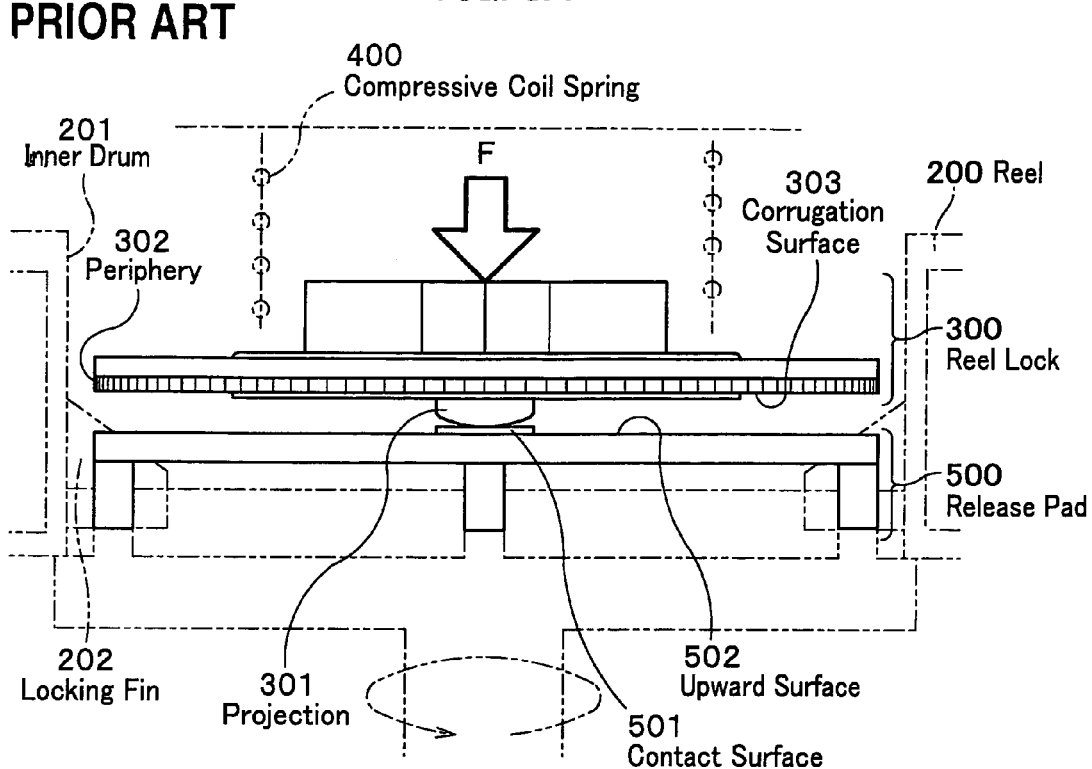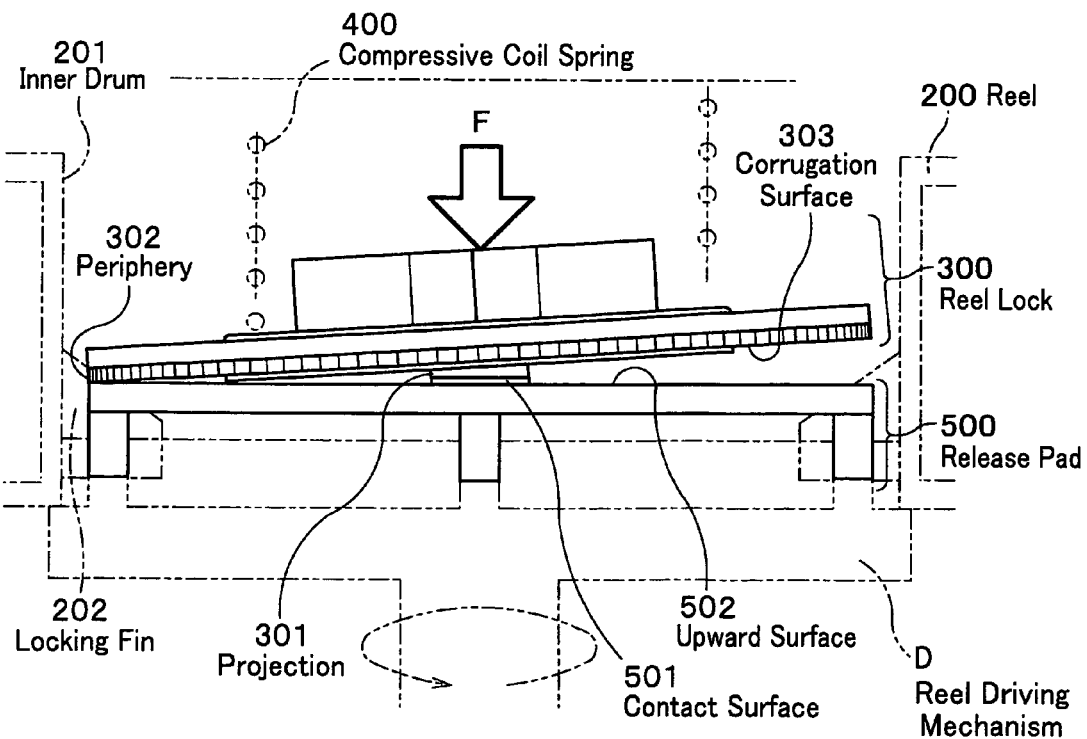

MAGNETIC TAPE CARTRIDGE

FIELD OF THE INVENTION

The present invention relates to a tape cartridge, specifically a construction to prevent a reel lock from eccentric wear out in the rotation contact to a component accompany with the reel so that tilting of the reel lock against the reel rotation axis is prevented.

BACKGROUND OF THE INVENTION

Magnetic tape cartridges which are compliant to the LTO (Linear Tape Open) standard have been widely used for the data backup media of computer system. The construction of the magnetic tape cartridge (abbreviated as "a cartridge", hereinafter) is that a magnetic tape reel (abbreviated as "a reel", hereinafter) which can rotate to wind or feed out the magnetic tape wound therearound is set in the cartridge and the rotation is locked by a reel lock and unlocked by a release pad when the cartridge is unloaded from and loaded to a backup drive unit, respectively. This mechanism supports the unexpected rotation of the reel so that the magnetic tape is not jammed up in the cartridge. Both reel lock and the release pad are installed in a center room formed in the reel.

The FIG. 8A shows a zoom up cross sectional view of the reel lock and the release pad. FIG. 8A specifically shows the assembly of the cartridge when it is loaded to the backup drive for operation and therefore the reel is unlocked. The reel driving mechanism D pushes up the release pad 500 by which the reel lock 300 is pushed up to be released from the locking fins 202 by making a space between the locking fins 202 and the corrugation surface 303. When the reel driving mechanism D rotates the reel 200, then the release pad 500 rotates in conjunction with the reel 200 since the release pad is engaged with the reel 200 in the inner drum 201. A projection 301 that has a round head formed in the center portion on the downward surface of the reel lock 300 is pushed in contact against a contact surface 501 formed in the center portion of the upward surface of the release pad 500. The reel lock 300 is pushed against the release pad 500 by a compressive coil spring 400.

The projection 301 of the reel 300 is abraded in contact with the contact surface 501 of the release pad 500, by which the projection 301 may be worn out eccentrically to the rotation axis. The cause of this problem is due to lack of impartial spring force against the upward surface of the reel lock 300 and the physical fact such that there is no stable contact point between the round head of the project 301 and the plane surface at the contact surface 501 when the projection 301 and the contact surface 501 are pushed therebetween. As the result of the eccentric worn out of the projection, the reel lock 300 becomes unparallel to the release pad 500 or the bottom surface of the inner drum 201 as shown in FIG. 8B. Then the peripheral portion 302 of the reel lock 300 may touch the locking fins 202 formed in the inner drum 201 of the reel 200 and generate a noisy sound. To prevent the generation of the noisy sound, a conventional technology has been proposed in a patent in the reference 1 where a metal plate attached onto the top of the contact surface 501 so that the wear out is reduced, which means the time until the wear out can be extended. Therefore it is possible to keep long time before such noise starts to be generated. The locking fins 202 are to seize the reel lock 300 at the corrugation surface 303 formed on the downward surface of the reel lock 300 so that the reel latched to stop.

Reference 1

Published Japanese Patent Application: Paragraph 0016 and the FIG. 5, JP, 2002-197833, A (2003)

BRIEF SUMMARY OF INVENTION

For the conventional technology as described in the reference 1, an additional process to attach a metal plate on the contact surface 501 of the release pad 500 is necessary. This process results in increasing the manufacturing cost. We should be noted that the importance is to prevent the reel lock 300 to become unparallel to the release pad when the projection is worn out but not to prevent the projection to wear out.

This invention has an advantage that the reel lock 300 tends not to become unparallel to the release pad so that the present invention can serve for a long lifetime of the cartridges before the generation of the noisy sound.

BRIEF DESCRIPTION OF THE DRAWINGS

FIG. 8A is a schematic that shows the contact of the reel lock and the release pad of the conventional magnetic tap cartridge before wearing out.

FIG. 8B is a schematic that shows the contact of the reel lock and the release pad of the conventional magnetic tap cartridge after wearing out.

DETAILED DESCRIPTION OF THE INVENTION

Figure 1:
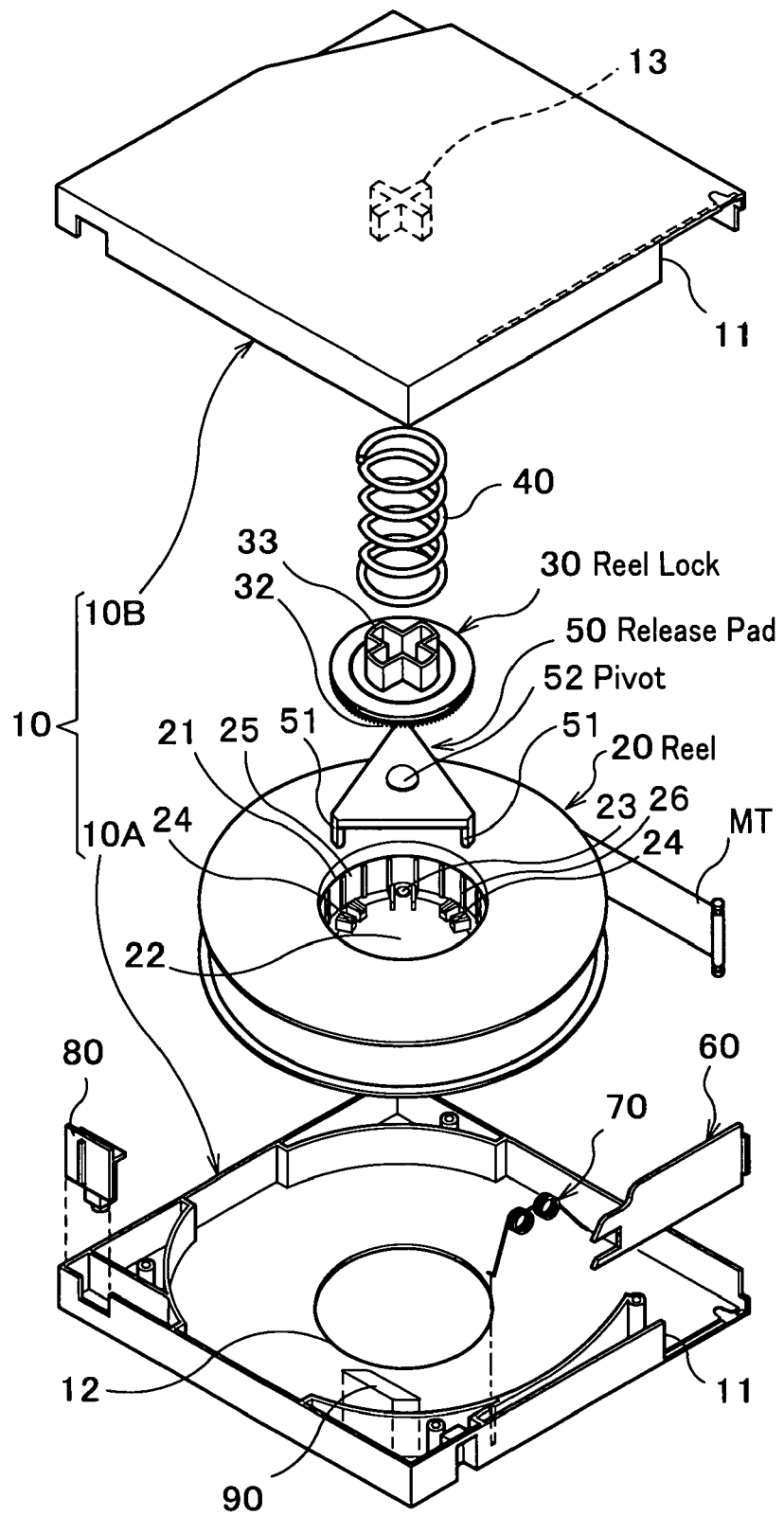
FIG. 1 is a schematic that shows a perspective view of the disassembly of the magnetic tape cartridge.

The construction of the cartridge regarding the present invention is that a reel which can rotate to wind or feed out the magnetic tape wound therearound is set in the cartridge and the rotation is locked by a reel lock that seizes the reel by being pushed against the reel with a spring and the rotation is unlocked by the release pad pushed back against the force of the spring. The reel can rotate to wind or feed out the magnetic tape wound therearound after being unlocked. The release pad has a pivot, of which tip has a partial globe shape head, on the surface facing to the reel lock and the reel lock has a recess on the surface facing to the release pad. The curvature of the recess is larger than that of the pivot and the head of the pivot contacts within the recess.

In this construction of the cartridge, the pivot head keeps the contact at the deepest position of the recess in the rotation since such contact between the pivot head and the recess provides the lowest position potential in the rotation of the release pad that rotates in conjunction with rotation of the reel. This is due to the physical fact such that there is a stable contact point between the partial globe shape head of the pivot and the recessed surface which is at the deepest position of the recessed stage when the pivot and the recess are pushed each other. Therefore the rotation axis of the pivot meets the deepest position to which a normal axis, that has the right angle against the reel lock surface, is prescribed in the recess. As the result, the rotation axis of the pivot coincides with the normal axis of the recess so that the reel rotation plane is geometrically kept parallel to the reel lock. This is true while the pivot head of the release pad is wearing out in contact with the recessed surface of the reel lock, therefore the peripheral portion of the reel lock hardly touches the locking fins formed in the central room of the reel and generates no rubbing noise. In addition, the wear out of the globe shape head of the pivot which is always contacting with the recessed stage is kept homogenously going on and no edge on the worn out surface is made on the globe shape head during wearing. This maintains smooth rotation of the reel against the reel lock and no eccentric wearing or rotational resistance is generated in the pivot, which continuously keeps the coincidence of the rotation axis of the pivot with the normal axis of the recess so that the reel rotation plane is geometrically kept parallel to the reel lock, as well.

Since the recessed stage is formed in a single molding process in the fabrication of the reel lock and no additional metal plate is necessary as well, this construction serves for the cost down in manufacturing these cartridges.

The curvature of the recess is preferable to be in the range of 10 to 20 times larger than the curvature of the head of the pivot. This range of curvature provides a contact point defined in a position potential scheme so that a stable contact point is determined even for the unbalanced spring force applied to the reel lock. Therefore the reel lock can be kept in parallel to the rotation plane of the reel while the pivot head is wearing in tape winding or feeding out for long term use of the cartridge.

Embodiments of the present invention will be explained using the figures as follows.

FIG. 1 shows the overall construction of the cartridge regarding the present invention. The cartridge case 10 is compliant to the LTO standard. The cartridge case 10 is composed of a lower shell 10A and an upper shell 10B. All components are installed in the cartridge case 10 as a reel 20 around which the magnetic tape MT is wound, a reel lock 30 to seize the reel 20 locked against the reel rotation, a compressive coil spring 40, a release pad 50, a sliding plate 60 attached to the window 11 through which the magnetic tape is drawn out or re-wound, a torsion coil spring 70 which keeps the sliding plate normally shut, a non-erase tab 80 and a cartridge memory chip 90. The lower shell 10A has an open hole 12 through which the reel is rotationally driven at the reverse side (not shown in the figures) of the central room of the reel 20.

The reel 20 has a central room, surrounded by an inner drum 21, which is opened to the upper shell 10B. The bottom surface 22 of the central room has three set holes 23 (one of them is shown in FIG. 1) to which unlock pins 51 formed onto the release pad 50 are inserted. Three bunches of locking fins 24 (two of them are shown in FIG. 1) are formed as each bunch locates between two set holes 23. The upper surface of the bunch of locking fins 24 forms a rack surface to which the corrugation surface of the reel lock 30 seizes. The surface 25 of the inner drum 21 has supplemental ribs 26 around the inner circle positions except for the positions of the set holes 23. In the inner drum 21, the release pad 50, the reel lock 30 and the compressive coil spring are embedded.

Figure 2:
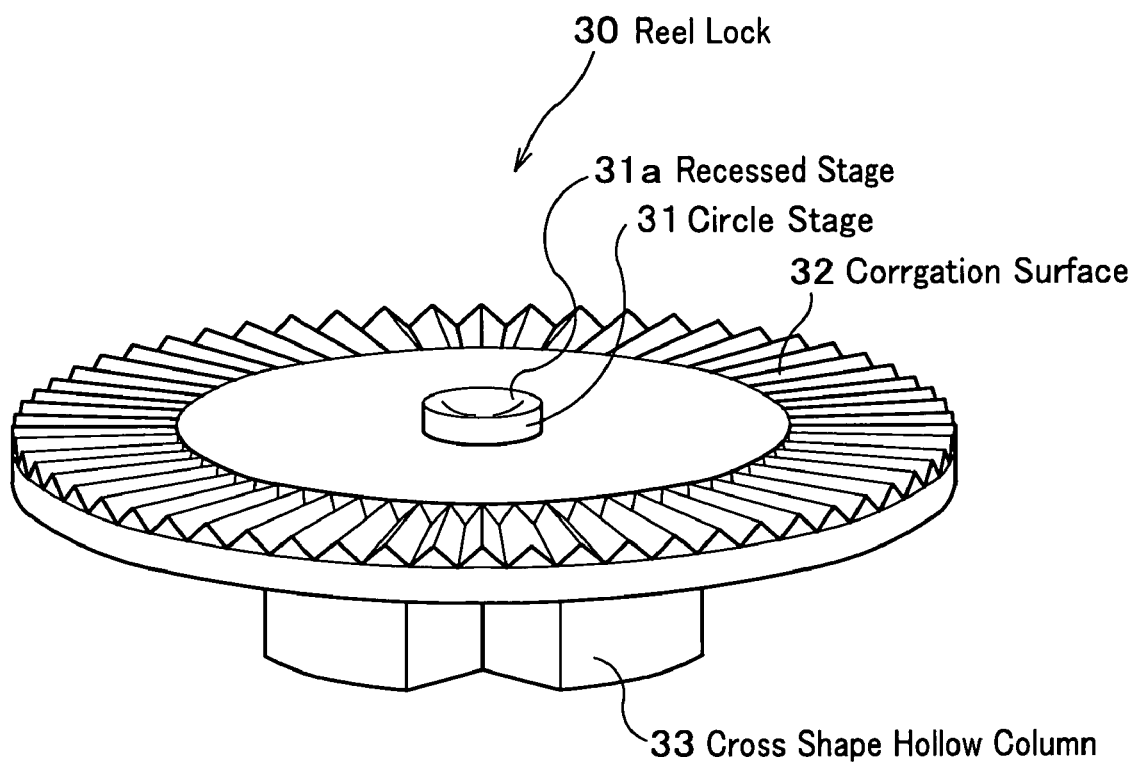
FIG. 2 is a schematic that shows a zoom up view of the reel lock.

The reel lock 30 is formed in substantially circle shape as shown in FIG. 2 and has a circle stage 31. The surface of the circle stage 31, that is a recessed stage 31a, is not a plane but slightly recessed. The recessed surface of the recessed stage 31a which has a doom shape with curvature R1 (defined by the radius) contacts with the pivot 52 formed on the upper surface of the release pad 50. The features of the contact will be explained in the other paragraphs.

The bottom surface of the reel lock (which is shown as an upper surface in FIG. 2) has a corrugation surface 32 in the peripheral area which seizes on the locking fins 24 formed in the bottom surface 22 of the central room. In the central portion on the upper surface of the reel lock 30, a cross shape hollow column 33 to which a cross shape projection 13 (see FIG. 1) formed in the inner surface of the upper shell 13B is to be inserted. The reel lock 30 is pressed down onto the release pad 50 by a compressive coil spring 40, surrounding the cross shape hollow column 33, put between the upper shell 10B and the release pad 50. Then the corrugation surface is pushed to the bunches of the locking fins 24.

Figure 3:
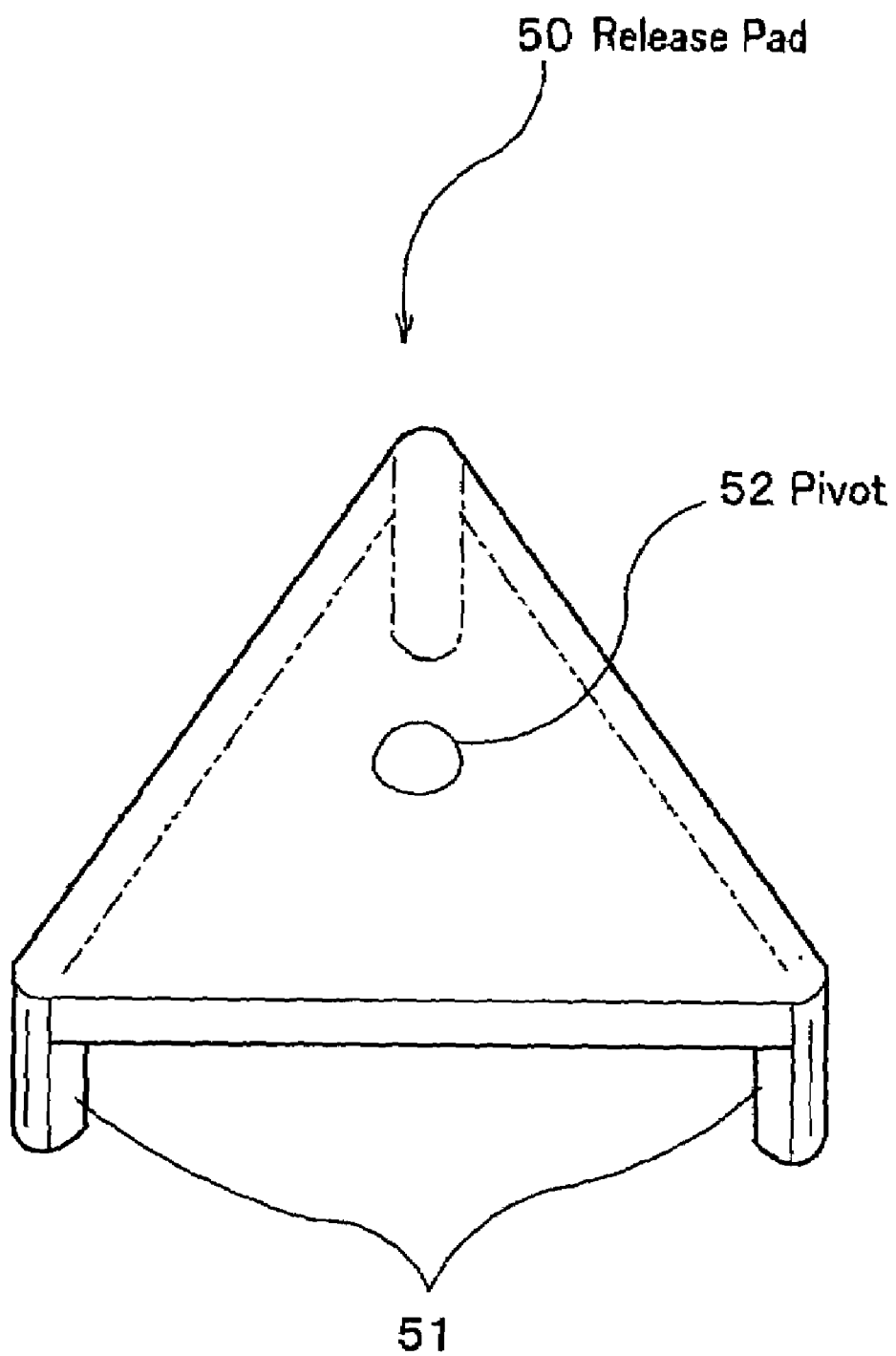
FIG. 3 is a schematic that shows a zoom up view of the release pad.

The release pad 50 is formed in a substantially triangle shape as shown in FIG. 3. At the triangle corners, unlock pins 51 (two unlock pins are shown in FIG. 3) are formed as they are inserted into set holes 23. The pivot 52 is formed in the central portion of the release pad 50 to contact with the recessed stage 31a formed in the central surface of the reel lock 30. The pivot 52 has a partial globe shape head with a radius of R2. The release pad 50 is set in the central room of the reel and put under the reel rock 30.

Figure 4A:
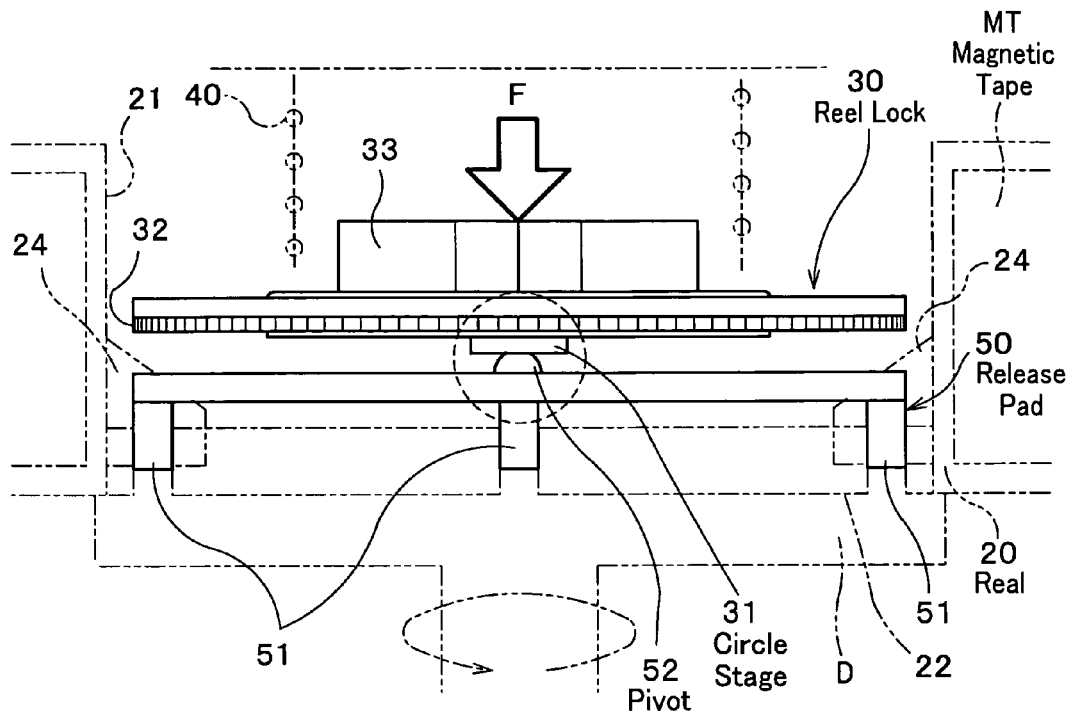
FIG. 4A is a schematic that shows a zoom up view of the contact portion between the reel lock and the release pad of the magnetic tape cartridge shown in FIG. 1.
Figure 4B:
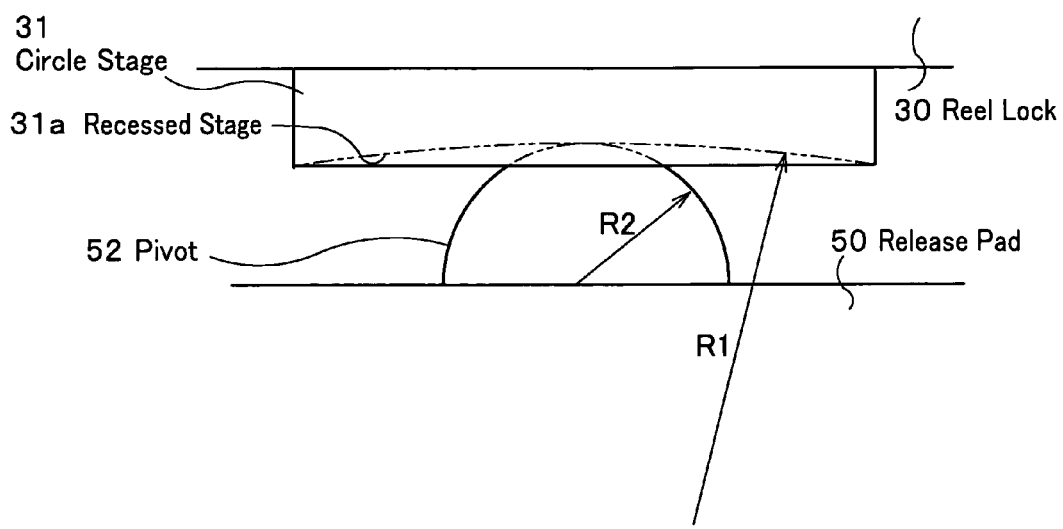
FIG. 4B is another schematic that shows a further zoom up view of the contact portion between the recessed stage of the reel lock and the pivot formed on the release pad of the magnetic tape cartridge shown in FIG. 4A.
Figure 5A:
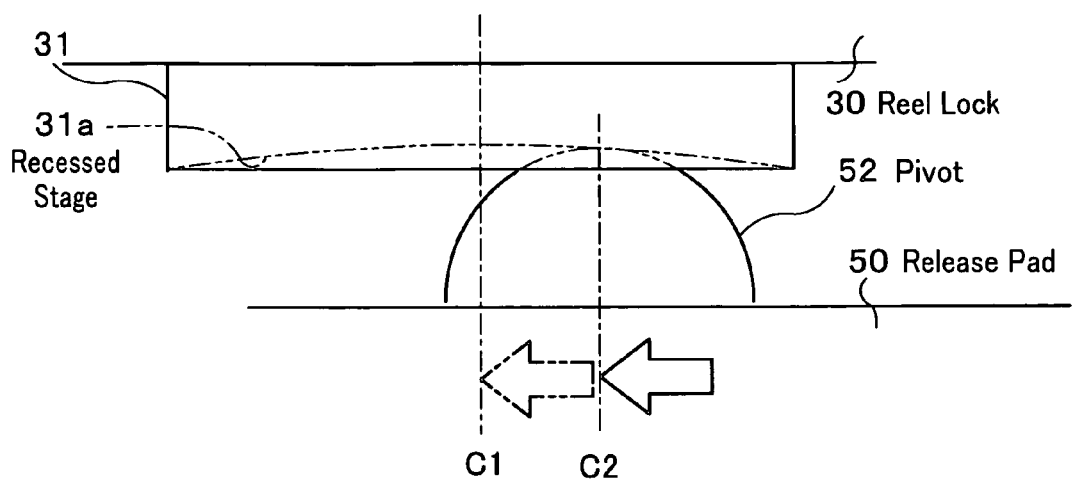
FIG. 5A is a schematic that shows the pivot center of the release pad deviated from the center of the recessed stage of the reel lock.
Figure 5B:
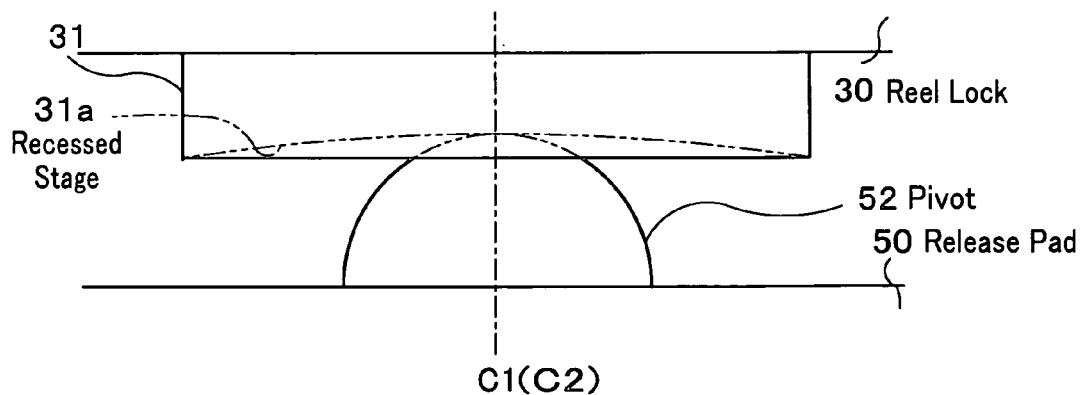
FIG. 5B is a schematic that shows the pivot center of the release pad that has no deviation from the center of the recessed stage of the reel lock.

The contact between the reel lock 30 and the release pad 50, when the cartridge is loaded in the backup drive unit, is explained in FIG. 4 to 6.

FIG. 4A shows the zoom up cut-view of the contact between the reel lock 30 and the release pad 50. When the cartridge is driven by the reel driving mechanism D to rotate the reel 20, the recessed stage 31a formed in the circle stage 31 formed in the reel lock 30 contacts with the pivot 52 on the release pad 50. The radius R1 of the recessed stage 31a is, as shown in FIG. 4B, 10 to 20 times larger than the radius R2 of the head of the pivot 52.

Figure 6A:
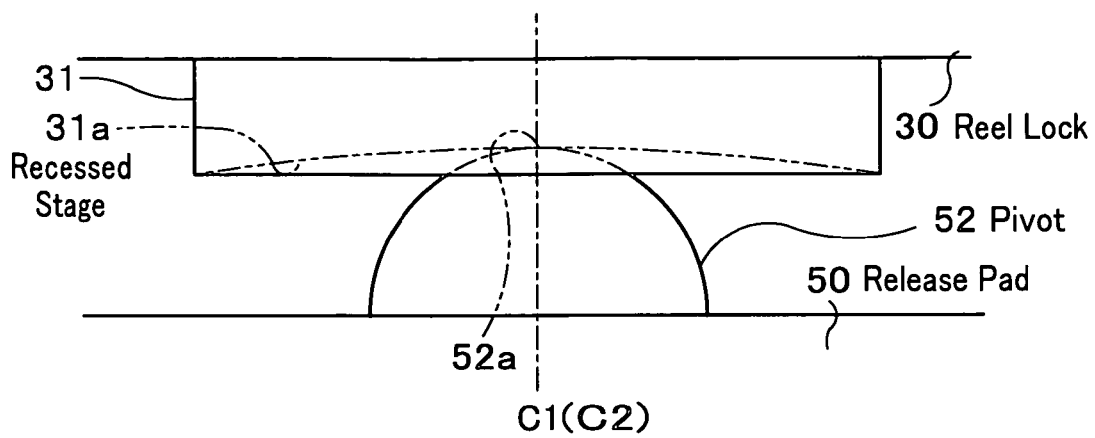
FIG. 6A is a schematic that shows the contact portion between the recessed stage of the reel lock and the pivot formed on the release pad as shown in FIG. 4B.
Figure 6B:
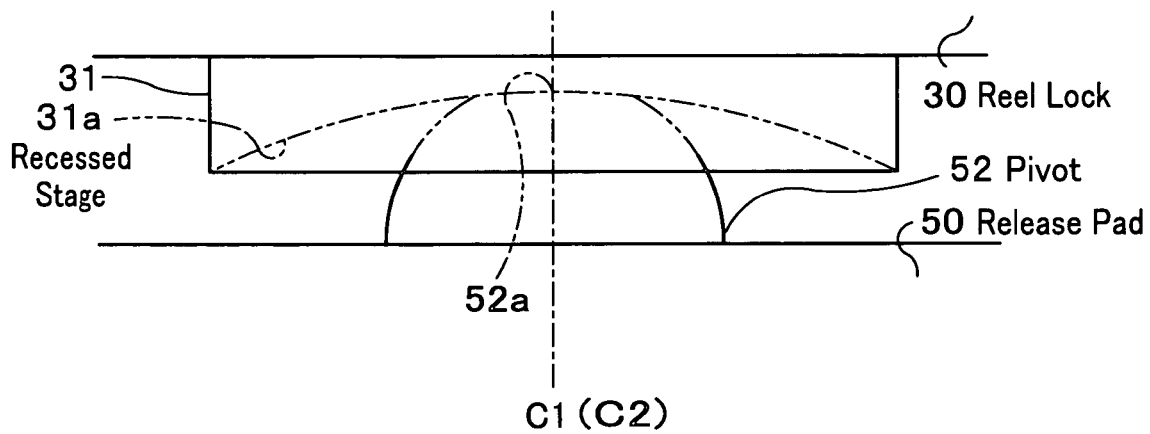
FIG. 6B is a schematic that shows the pivot formed on the release pad which is worn out at the contact with the recessed stage of the reel lock.

FIG. 5A shows the status where the reel lock 30 and the release pad slightly eccentrically contacts each other. When the reel is rotated in high-speed to access the head portion or the header of the records memorized in the magnetic tape of the cartridge, the center C2 of the pivot moves toward the center C1 of the reel lock since the position potential energy between the reel lock 30 and the release pad 50 in the rotational dynamics becomes less. This movement such that the distance between the center C1 and C2 becomes small is caused by the rule of the minimum position potential as far as the radius R1 of the recessed stage 31a is larger (about 10 to 20.) than the head of the pivot FIG. 6A shows the reel lock 30 and the release pad 50 where the recessed stage 31a contacts with the pivot 52 formed on the release pad which rotates with the reel 20. FIG. 6B shows the wear out of the head portion of the pivot 52 contacting with the recessed stage 31a of the reel lock 30. In this wear out, the specific position of the contact between the head of the pivot 52 and the surface of the recessed stage 31a is uniquely determined due to the lowest potential energy of the compressive spring force between the release pad and the reel lock. Therefore the head of the pivot and the most recessed position on the recessed stage are uniformly worn out. No positional shift of contact between the head of the pivot 52 and the surface of the recessed stage 31a is made and therefore the release lock 30 keeps being parallel to the release pad 50.

Other scheme of the contacts between the reel lock 30 and the release pad 50 will be explained in FIG. 7.

Figure 7A:
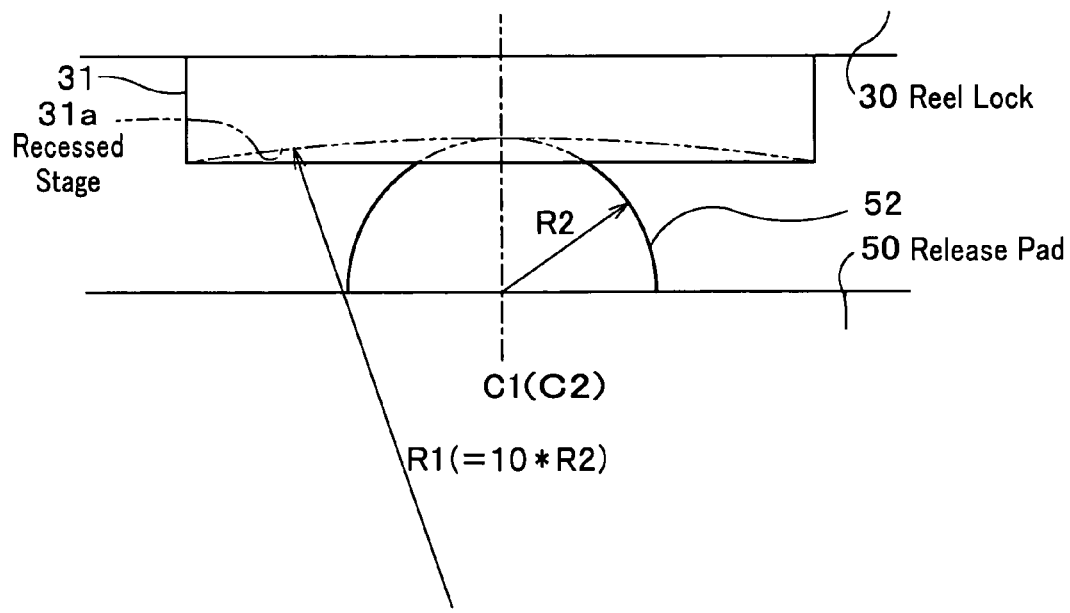
FIG. 7A is a schematic that shows a set of the dimensions related to the curvature of the recessed stage of the reel lock and the globe curvature of the pivot formed on the release pad.
Figure 7B:
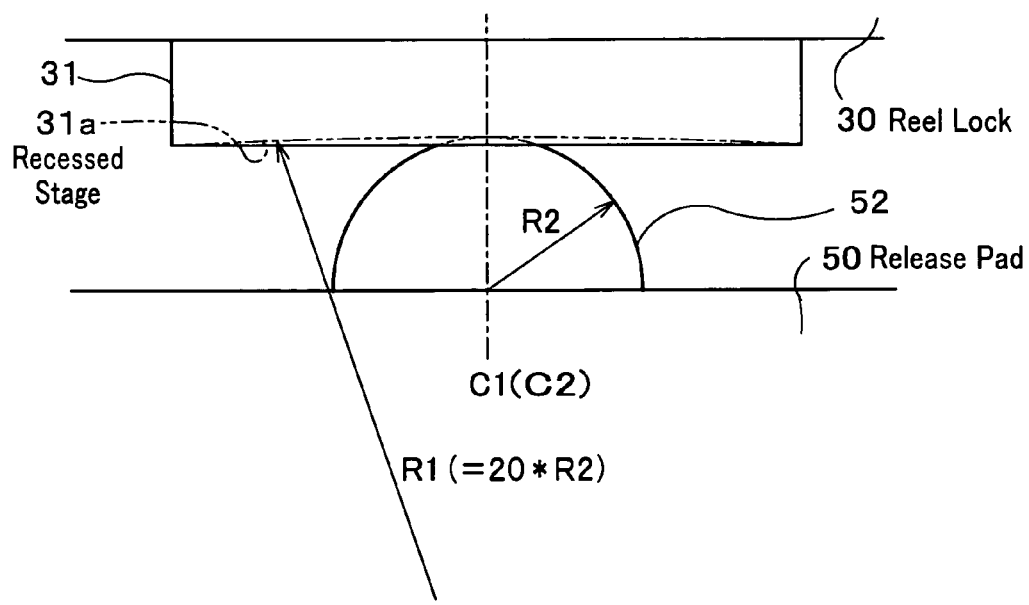
FIG. 7B is a schematic that shows another set of the dimensions related to the curvature of the recessed stage of the reel lock and the globe curvature of the pivot formed on the release pad.

FIG. 7A shows the case when the radius R1 of the curvature of the recessed stage is ten times larger than the radius R2 of the curvature of the partial globe shape head of the pivot 52. FIG. 7B shows the case when the radius R1 is twenty times larger than such head of the pivot 52.

As shown in these two examples, the wear out at the contact between the recessed stage 31a and the pivot 52 does not shift the position and constantly is going on so that the reel lock 30 keeps being parallel to the release pad 50 during wearing. In other words, the reel lock 30 is prevented from eccentric rotation so that the tilting against the reel rotation axis is prevented. Therefore periphery of the reel lock 30, which is a part of the corrugation surface, hardly touches the bunches of the locking fins 24 formed in the central room of the reel and generates no rubbing noise as the result.

The embodiment of the present invention has been explained regarding the cartridge that houses, therein, a magnetic tape which is called a magnetic tape medium as being fabricated in a construction of a magnetic recording or recordable material layer formed on a tape film base. But the present invention is not confined in such a recording medium but other tape media such as optical tape recording media comprising a tape film base and a layer of optical recording materials such as magneto-optical materials, optical phase changing materials and spectral hole burning materials and organic dyes can be used for the tapes that the cartridge proposed in the present invention houses therein.

What is claimed:

1. A tape cartridge comprising:
    a reel that freely rotates in the tape cartridge to wind and feed out a tape,
    a reel lock that prevents the reel from rotating by pushing against said reel with a discrete spring, said reel lock able to incline freely, and,
    a release pad that unlocks said reel for rotation, by pushing said reel lock back against a force of said spring,
    wherein:
        said release pad has a pivot facing to said reel lock,
        a tip surface of said release pad is a partial globe shape head,
        said reel lock has a recessed stage facing to said release pad,
        a surface of said recessed stage is recessed with a radius of curvature 10 to 20times larger than a radius of said partial globe shape head, and
        said globe shape head and said recessed stage contact together.

2. A tape cartridge according to claim 1,
    wherein said recessed stage is formed in a single molding process used for fabrication of said reel lock.

3. A tape cartridge according to claim 2,
    wherein said tape is a magnetic tape medium.

4. A tape cartridge according to claim 2,
    wherein said tape is an optical tape recording medium.

5. A tape cartridge according to claim 1,
    wherein said tape is a magnetic tape medium.

6. A tape cartridge according to claim 1,
    wherein said tape is an optical tape recording medium.

* * * * *